(12) United States Patent
Chen (10) Patent No.: US 9,179,775 B2
(45) Date of Patent: Nov. 10, 2015

(54) MONITOR SUPPORTING MODULE

(71) Applicant: AOpen Inc., New Taipei (TW)

(72) Inventor: Chih-Hsiung Chen, New Taipei (TW)

(73) Assignee: AOPEN INC., New Taipei (TW)

( * ) Notice: Subject to any disclaimer, the term of this patent is extended or adjusted under 35 U.S.C. 154(b) by 0 days.

(21) Appl. No.: 14/707,181

(22) Filed: May 8, 2015

(65) Prior Publication Data

US 2015/0238013 A1    Aug. 27, 2015

Related U.S. Application Data

(62) Division of application No. 13/864,392, filed on Apr. 17, 2013.

(30) Foreign Application Priority Data

Aug. 14, 2012   (TW) .............................. 101129360 A (51) Int. Cl.
```
A47B 96/06      (2006.01)
A47B 97/00      (2006.01)
F16M 13/02      (2006.01)
F16M 11/04      (2006.01)
F16M 11/10      (2006.01)
F16B 12/10      (2006.01)
```
(52) U.S. Cl.
CPC .............. *A47B 97/001* (2013.01); *F16B 12/10* (2013.01); *F16M 11/041* (2013.01); *F16M 11/10* (2013.01); *F16M 13/02* (2013.01)

(58) Field of Classification Search
CPC combination set(s) only.
See application file for complete search history.

(56) References Cited

U.S. PATENT DOCUMENTS

| | | | |
|---|---|---|---|
| 6,559,829 B1 | 5/2003 | Matsuo et al. | |
| 7,070,156 B2 | 7/2006 | Liao | |
| 7,398,949 B2 * | 7/2008 | Weech et al. | 248/220.21 |
| 7,878,473 B1 | 2/2011 | Oh | |
| 7,891,622 B1 * | 2/2011 | O'Keene | 248/292.13 |
| 8,025,264 B2 | 9/2011 | Cheng et al. | |
| 8,094,438 B2 * | 1/2012 | Dittmer et al. | 361/679.01 |
| 8,191,837 B2 | 6/2012 | Chen et al. | |
| 8,267,362 B2 | 9/2012 | Cheng et al. | |
| 8,740,164 B2 * | 6/2014 | Tachibana | 248/276.1 |
| 8,837,132 B2 | 9/2014 | Lin et al. | |

(Continued)

OTHER PUBLICATIONS

TW Office Action dated Jun. 10, 2015 in corresponding Taiwan application (No. 101129360).

(Continued)

*Primary Examiner* — Monica Millner
(74) *Attorney, Agent, or Firm* — McClure, Qualey & Rodack, LLP (57) ABSTRACT

The invention relates to a monitor supporting module including: two supporting stands fixed to a placing space, two fixing stands disposed on the rear of a flat panel display, two guide bars and two guide rails. The setting positions of the guide bars are corresponding to the guide rails. Each guide rail includes a notch, a first horizontal guide section, a vertical guide section and a second horizontal guide section. Each guide bar is guided to a corresponding notch through its protruded end edge and slides through the guide sections for completing the installation. The guide rails are respectively formed on corresponding supporting stands, and the guide bars are protruded from one side of corresponding fixing stands. Or, the guide bars are respectively disposed on corresponding supporting stands and the guide rails are formed on corresponding fixing stands.

6 Claims, 10 Drawing Sheets

(56) References Cited

U.S. PATENT DOCUMENTS

| | | |
|---|---|---|
| 2005/0061937 A1 | 3/2005 | Kim |
| 2008/0035813 A1 | 2/2008 | O'Keene et al. |
| 2008/0192418 A1* | 8/2008 | Zambelli et al. ............. 361/681 |
| 2008/0315049 A1 | 12/2008 | Bailo et al. |
| 2009/0294599 A1* | 12/2009 | Chen et al. ...................... 248/65 |
| 2010/0006725 A1 | 1/2010 | Kim et al. |
| 2010/0012799 A1 | 1/2010 | Sexton |
| 2010/0038501 A1 | 2/2010 | Oh |
| 2010/0123052 A1 | 5/2010 | Cheng et al. |
| 2010/0258696 A1 | 10/2010 | Cheng et al. |
| 2011/0011993 A1 | 1/2011 | Cheng et al. |
| 2011/0011996 A1 | 1/2011 | Cheng et al. |
| 2011/0012001 A1 | 1/2011 | Cheng et al. |
| 2011/0174939 A1 | 7/2011 | Taylor |
| 2013/0037670 A1 | 2/2013 | Lu et al. |
| 2013/0206943 A1 | 8/2013 | Molter |

OTHER PUBLICATIONS

Partial English translation of TW Office Action dated Jun. 10, 2015 in corresponding Taiwan application (No. 101129360).

* cited by examiner

MONITOR SUPPORTING MODULE

This application is a divisional application of U.S. application Ser. No. 13/864,392, filed Apr. 17, 2013, now U.S. Pat. No. 9,057,478, which claims the benefit of Taiwan application Serial No. 101129360, filed Aug. 14, 2012, the disclosure of which is incorporated by reference herein in its entirety.

TECHNICAL FIELD

The disclosure relates in general to a monitor supporting module, and more particularly to a monitor supporting module with the application of embedding installation for installing a flat panel display into a recessed region of a wall such that the overall appearance of the flat panel display and the wall is even and smooth.

BACKGROUND

With the continuous advance in the photoelectric and display technology, flat-screen TV such as plasma display panel (PDP) TV, liquid crystal display (LCD) TV or projection liquid crystal on silicon (LCOS) TV, has gained great popularity and achieved mature manufacturing technology. In comparison to the conventional cathode ray tube (CRT) TV, the flat-screen TV, has better audio/video effects and fair prices and is lighter, slimmer, and capable of using digitalized and web-based TV signal to provide consumers with various forms of entertainment, and has virtually become a mainstream in today's TV industry.

The flat-screen TV, being a flat type monitor or screen device, occupies a smaller installation space, and can be designed to have a larger size. The flat-screen TV can be installed on a TV cabinet in a way similar to the installation of a conventional cathode ray tube TV or can be mounted or suspended on the wall, the ceiling or the desktop. The mounting or suspension structure of the flat-screen TV is manufactured according to the standard specification stipulated by the video electronics standard association and is normally known as VESA mount specification. That is, relevant fixing stands or wall mounting holes are disposed on the rear of the flat-screen TV such that the flat-screen TV can be mounted or suspended by way of screw latching.

The installation holes designed with respect to the flat-screen TV of different sizes and weights normally have corresponding pitches conformed to the VESA specification. Apart from being mounted on the wall by using corresponding fixing stands or wall hanging racks, the flat-screen TV can incorporate with other devices such as rotation bracket, suspension bracket or supporting stand, so that the viewing angle of the flat-screen TV can be extended or adjusted from the placing space. Although the flat-screen TV has become lighter and slimmer and can be mounted on the wall, the flat-screen TV is still protruded from the wall and the evenness of the wall still has room for improvement. For the flat-screen TV to be flushed with the wall as much as possible, the corresponding suspension structure (such as grooves and hooks) of the wall hanging racks also become lighter, shorter and smaller. Inevitably, people would question whether the flat-screen TV may come off the mechanism or not.

SUMMARY

The disclosure is directed to a monitor supporting module for embedding a flat panel display into a recessed region of the wall, such that the overall appearance of the flat panel display and the wall is even and smooth. The flat panel display installed through the structural design between the guide rails and the guide bars of the monitor supporting module effectively avoid the flat panel display coming off the mechanism. Moreover, the monitor supporting module can further be augmented through simple assembly such that several flat panel displays can be installed in parallel for presenting the display effect of a large-sized TV wall.

According to one embodiment, a monitor supporting module used in the installation of a first flat panel display is disclosed. The monitor supporting module includes: a first supporting stand, a second supporting stand, and a first fixing component. The first supporting stand is fixed to a placing space, and further has a first guide rail. The second supporting stand is fixed to the placing space, and further has a second guide rail symmetric to the first guide rail. The first fixing component has a first fixing stand and a second fixing stand, which are disposed on the rear of the first flat panel display. The first fixing component further has a first guide bar and a second guide bar, which are respectively protruded from one side of the first fixing stand and the second fixing stand. The setting positions of the guide bars are corresponding to the guide rails. Each guide rail has a notch, a first horizontal guide section, a vertical guide section and a second horizontal guide section. Each guide bar is guided to the corresponding notch through its protruded end edge and slides through the first horizontal guide section, the vertical guide section and the second horizontal guide section for completing the installation.

According to another embodiment, a monitor supporting module used in the installation of a flat panel display is disclosed. The monitor supporting module includes: a first supporting stand, a second supporting stand, and a fixing plate. The first supporting stand is fixed to a placing space, wherein a first guide bar is disposed on the first supporting stand. The second supporting stand is fixed to the placing space, wherein a second guide bar is disposed on the second supporting stand. The fixing plate is disposed on the rear of the flat panel display. The two ends of the fixing plate respectively form a first fixing stand and a second fixing stand. The first fixing stand and the second fixing stand respectively have a first guide rail and a second guide rail, which are symmetric to each other. The setting positions of the guide bars are corresponding to the guide rails. Each guide rail has a notch, a first horizontal guide section, a vertical guide section and a second horizontal guide section. Each guide bar is guided to the corresponding notch by its end edge, and slides through the first horizontal guide section, the vertical guide section and the second horizontal guide section for completing the installation.

The above and other aspects of the invention will become better understood with regard to the following detailed description of the preferred but non-limiting embodiment(s). The following description is made with reference to the accompanying drawings.

DETAILED DESCRIPTION

Figure 1:
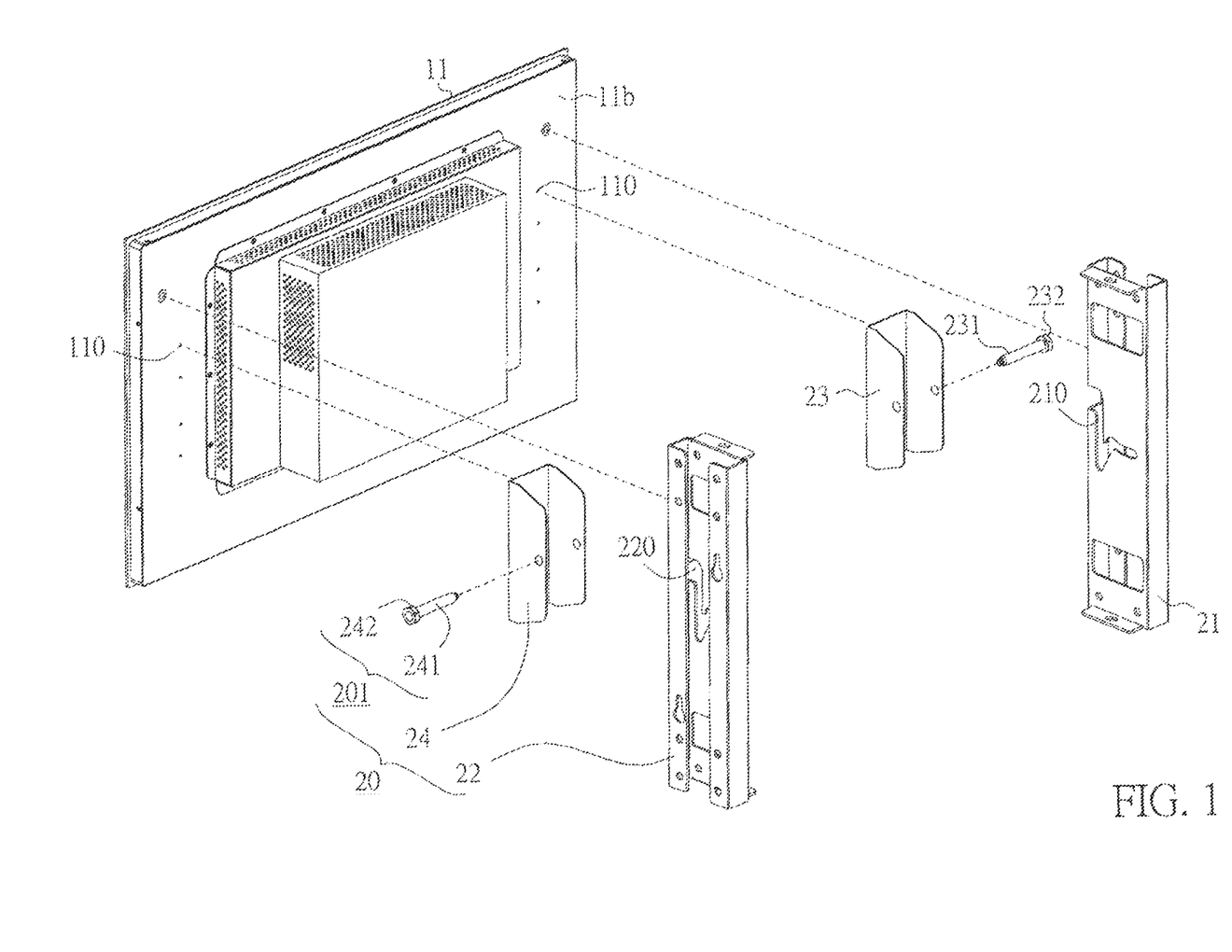
FIG. 1 shows an element decomposition diagram of a monitor supporting module 20 of the present invention.

The implementation of the present invention is exemplified by a first embodiment below. Referring to FIG. 1, an element decomposition diagram of a monitor supporting module 20 of the present invention is shown. As indicated in FIG. 1, the monitor supporting module 20 of the present invention is used in the installation of a first flat panel display 11. The monitor supporting module 20 includes a first supporting stand 21, a second supporting stand 22 and a first fixing component 201. In the present embodiment, the first fixing component 201 includes a first fixing stand 23, a second fixing stand 24, a first guide bar 231 and a second guide bar 241. The first supporting stand 21 and the second supporting stand 22 respectively have a first guide rail 210 and a second guide rail 220. Furthermore, the first guide rail 210 and the second guide rail 220 are symmetric to each other and are used for guiding corresponding guide bars. In the present invention, the guide rails are formed by hollowing corresponding elements.

In the present embodiment, the guide bars 231 and 241 are formed by elements with step screws. That is, the length of the guide bars 231 and 241 is larger than the width of the fixing stands 23 and 24, such that the guide bars 231 and 241 can respectively be protruded from one side of the first fixing stand 23 and the second fixing stand 24. Furthermore, corresponding screw holes can be formed on the fixing stands 23 and 24, and the guide bars 231 and 241 can pass through the screw holes by using the nuts with corresponding structure. In the present embodiment, the protruded end edges 232 and 242 of the guide bars 231 and 241 can be designed as a nut structure for guiding elements in corresponding guide rails for completing the installation.

Figure 2A:
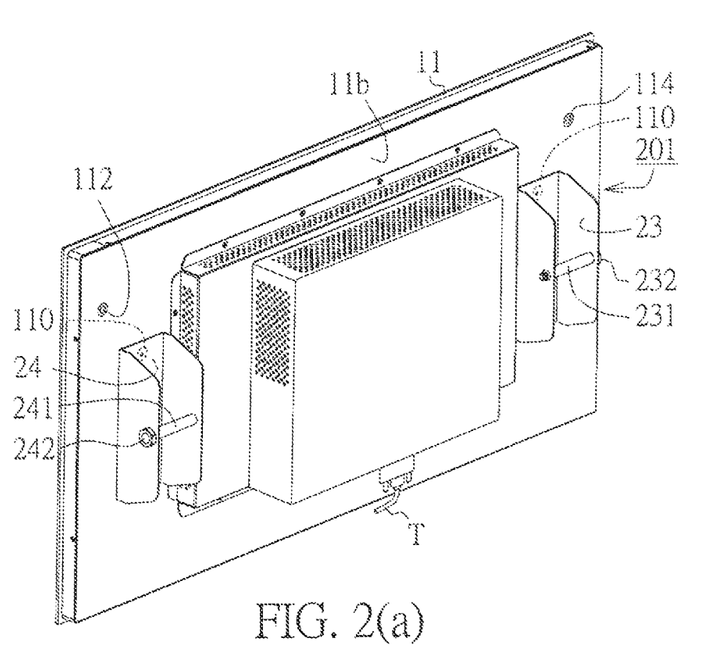
FIG. 2(a) shows a first fixing component 201 installed on a first flat panel display 11.
Figure 2B:
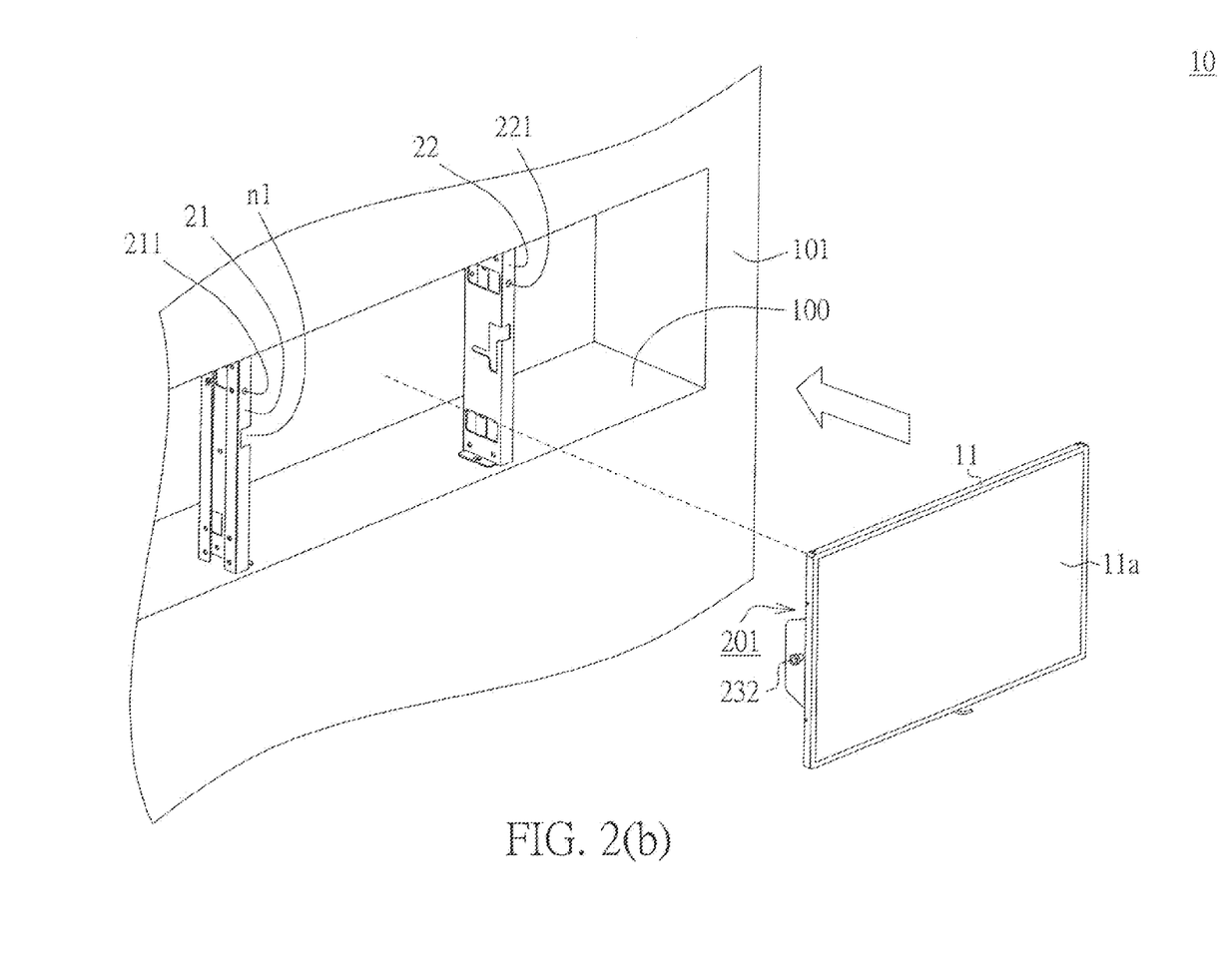
FIG. 2(b) shows a schematic diagram of assembling the first flat panel display 11 equipped with the first fixing component 201 to supporting stands 21 and 22.

Referring to both FIGS. 2(a) and (b). FIG. 2(a) shows the first fixing component 201 installed on the first flat panel display 11. FIG. 2(b) shows a schematic diagram of assembling the first flat panel display 11 equipped with the first fixing component 201 to the supporting stands 21 and 22. In the present embodiment, the monitor supporting module 20 is assembled to the flat panel display by embedding design. As indicated in FIG. 2(b), the first supporting stand 21 and the second supporting stand 22 are fixed to a placing space, such as a recessed region 100 of a wall 10, and the height of the first supporting stand 21 and the second supporting stand 22 is corresponding to that of the placing space (that is, the recessed region 100). Meanwhile, as indicated in FIG. 2(a), the first fixing stand 23 and the second fixing stand 24 are disposed on the rear 11b of the first flat panel display 11. A first wall cavity group 110 having corresponding position, distance and quantity is designed on the rear 11b of the first flat panel display 11, such that the first fixing stand 23 and the second fixing stand 24 can respectively be disposed on the corresponding holes of the first wall cavity group 110 by screws.

In the present embodiment, the first fixing stand 23 and the second fixing stand 24 are separated from each other and are respectively disposed on the two sides of the rear 11b of the first flat panel display 11 for effectively sharing the weight of the first flat panel display 11. Thus, when the setting positions of the supporting stands 21 and 22 are corresponding to the installation positions of the fixing stands 23 and 24 and the setting positions of the guide rails 210 and 220 are corresponding to the guide bars 231 and 241, the first flat panel display 11 can be installed on the supporting stands 21 and 22 accordingly.

Under the circumstances that the positions and distances of relevant elements are mutually corresponding, the two sides of the rear 11b of the installed first flat panel display 11 will lean on the supporting stands 21 and 22. As indicated in FIGS. 2(a) and (b), each of the two sides of the rear 11b of the first flat panel display 11 can further have at least one bump structure (such as elements 112 and 114) disposed thereon. The bump structures can be formed by elastic plastics. Several pit structures (such as elements 211 and 221) whose quantity and positions corresponding to that of the bump structures can be disposed on the supporting stands 21 and 22 for providing robustness between the supporting stands and the monitor assembled thereto and to help and share the guide bars 231 and 241 supporting the weight of the first flat panel display 11.

Figure 3A:
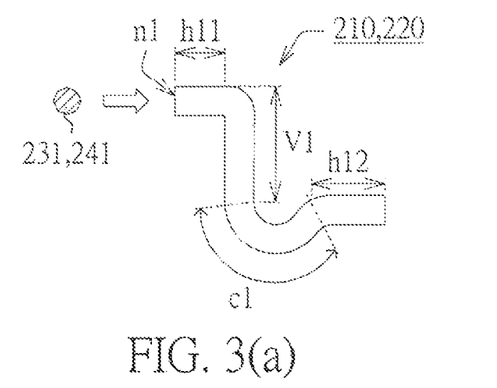
FIGS. 3(a) and (b) shows enlarged side views of guide rails 210 and 220.
Figure 3B:
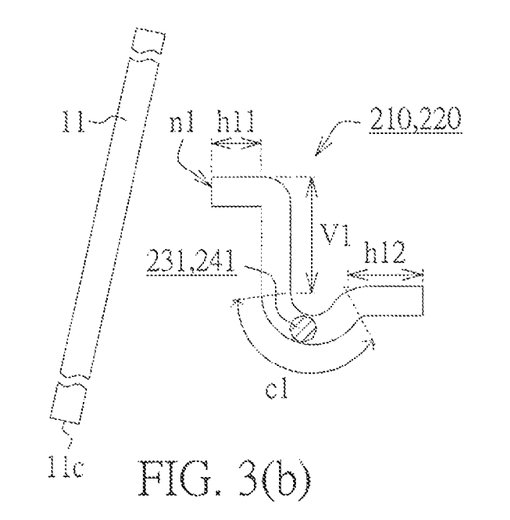

Referring to FIGS. 3(a) and (b), enlarged side views of the guide rails 210 and 220 are shown. FIG. 3(a) shows an installation diagram of guide bars 231 and 241. FIG. 3(b) shows the guide bars 231 and 241 being located in the guide rails 210 and 220. As indicated in FIGS. 3(a) and (b), each of the guide rails 210 and 220 has a notch n1, a first horizontal guide section h11, a vertical guide section v1 and a second horizontal guide section h12, and the notch n1 is for guiding the corresponding guide bars 231 and 241. To put it in greater details, the guide bars 231 and 241 are guided to the corresponding notches n1 through respective protruded end edges 232 and 242 (as indicated in FIG. 1 and FIGS. 2(a) and (b)). During the installation process, after the guide bars 231 and 241 enter corresponding notches n1, the monitor 11 moves on the first horizontal guide section h11 in a horizontal direction. Through the design of the vertical guide section v1, the guide bars 231 and 241 guide the monitor 11 to move in a vertical direction. When the guide bars 231 and 241 move to the bottom of the vertical guide section v1, the monitor 11 is suspended and will not come off the mechanism.

In the present embodiment, each of the guide rails 210 and 220 further has a bending section c1 formed between the corresponding vertical guide section v1 and the second horizontal guide section h12, wherein the bending section c1 can be semicircular or hooked and enables the corresponding guide bars 231 and 241 to be pivotally rotated through their protruded end edges 232 and 242 respectively. As indicated in FIG. 3(b), the bottom surface 11c of the first flat panel display 11 is exposed. To put it in greater details, when the guide bars 231 and 241 is located on the corresponding bending section c1, the first flat panel display 11 has not been completely loaded to the placing space (that is, the recessed region 100). That is, the two sides of the rear 11b are separated from the supporting stands 21 and 22 by a distance, wherein the distance enables the monitor 11 to tilt or rotate to an angle. That is, the guide bars 231 and 241 are pivotally rotated on the bending section c1 so as to drive the bottom surface 11c of the first flat panel display 11 to be exposed. Through the exposed space, the user can assemble a signal transmission unit T (or other relevant signal terminals) located on the rear 11b of the first flat panel display 11 of FIG. 2(a) for connecting signals.

As disclosed above, the radian of the bending section c1 is corresponding to the guide bars 231 and 241. That is, the guide bars 231 and 241 located on the bending section c1 can be shifted and moved to the corresponding second horizontal guide section h12 by a force applied to the first flat panel display 11. After the guide bars 231 and 241 slide through the corresponding notch n1, the first horizontal guide section h11, the vertical guide section v1 and the second horizontal guide section h12 (including the bending section c1), the mounting and installation of the first flat panel display 11 are completed. Moreover, the two sides of the rear 11b of the first flat panel display 11 lean on the supporting stands 21 and 22.

Figure 4:
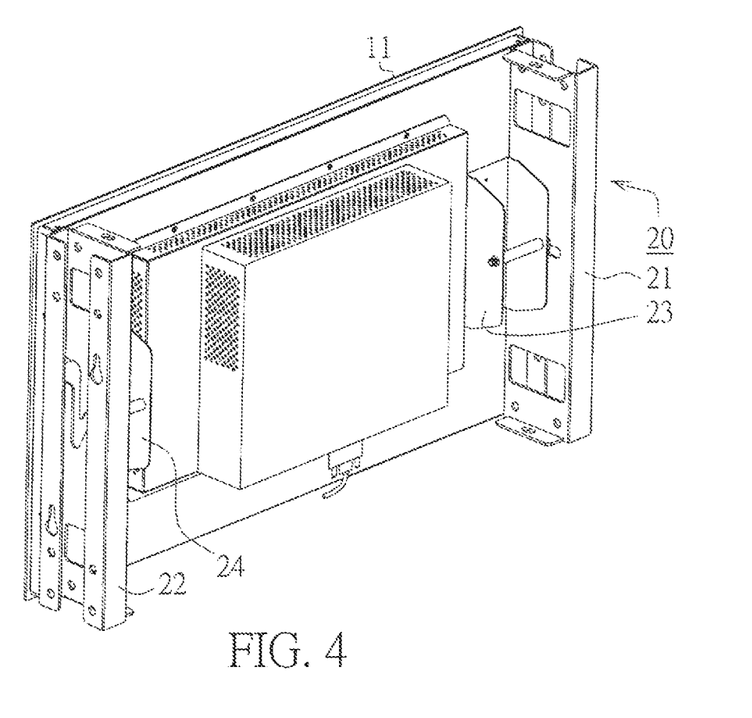
FIG. 4 shows a schematic diagram of the monitor supporting module 20 installed on the first flat panel display 11.

Referring to FIG. 4 shows a schematic diagram of the monitor supporting module 20 installed on the first flat panel display 11. The placing space is the recessed region 100 of the wall 10 as indicated in FIG. 2(b). In terms of design, the setting positions of the guide bars 231 and 241 are corresponding to the guide rails 210 and 220, the setting positions of the supporting stands 21 and 22 are corresponding to the thickness of the first flat panel display 11, and the height of the first flat panel display 11 is corresponding to that of the supporting stands 21 and 22 (that is, corresponding to the height of the recessed region 100 of the wall 10 at the same time). Moreover, the width of the recessed region can also be corresponding to that of the first flat panel display 11. Thus, the front side 11a of the first flat panel display 11 and the protruded region 101 of the wall 10 (as indicated in FIG. 2(b)) are located on the same plane, and the first flat panel display 11 can further cover the recessed region 100 of the wall 10 in an embedding manner, such that the overall appearance of the front side 11a and the wall 10 is even and smooth.

On the other hand, after the guide bars 231 and 241 are assembled to and mounted on the guide rails 210 and 220, the fixing stands 23 and 24 can respectively lean on the corresponding supporting stands 21 and 22. According to the design of a preferred implementation, a gap is formed between the fixing stands 23 and 24 and the corresponding supporting stands 21 and 22 for making the installation convenient and avoiding collision and friction. Moreover, through the design of the nuts of the protruded end edges 232 and 242, the guide bars 231 and 241, which can be detached from the guide rails 210 and 220 only via the corresponding notches n1, will not come off the mechanism easily.

The first embodiment is exemplified by the application of one single flat panel display. However, the monitor supporting module of the present invention conjunction with relevant elements can be used in the installation of several flat panel displays connected in parallel or augmented in other forms. Several flat panel displays connected in parallel can provide the display effect of a large TV wall.

Figure 5A:
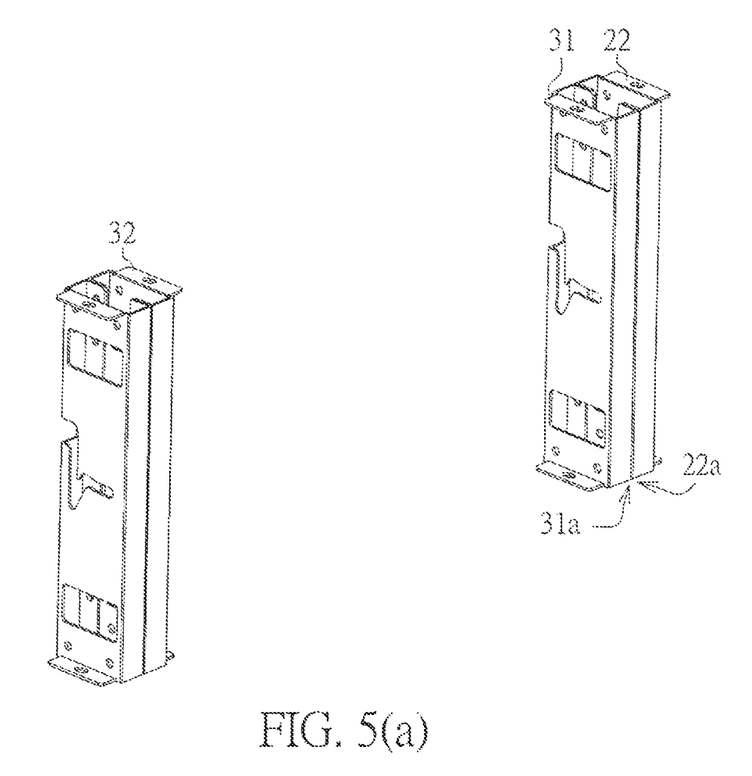
FIG. 5(a) shows a schematic diagram of two supporting stands connected in parallel in a horizontal direction.
Figure 5B:
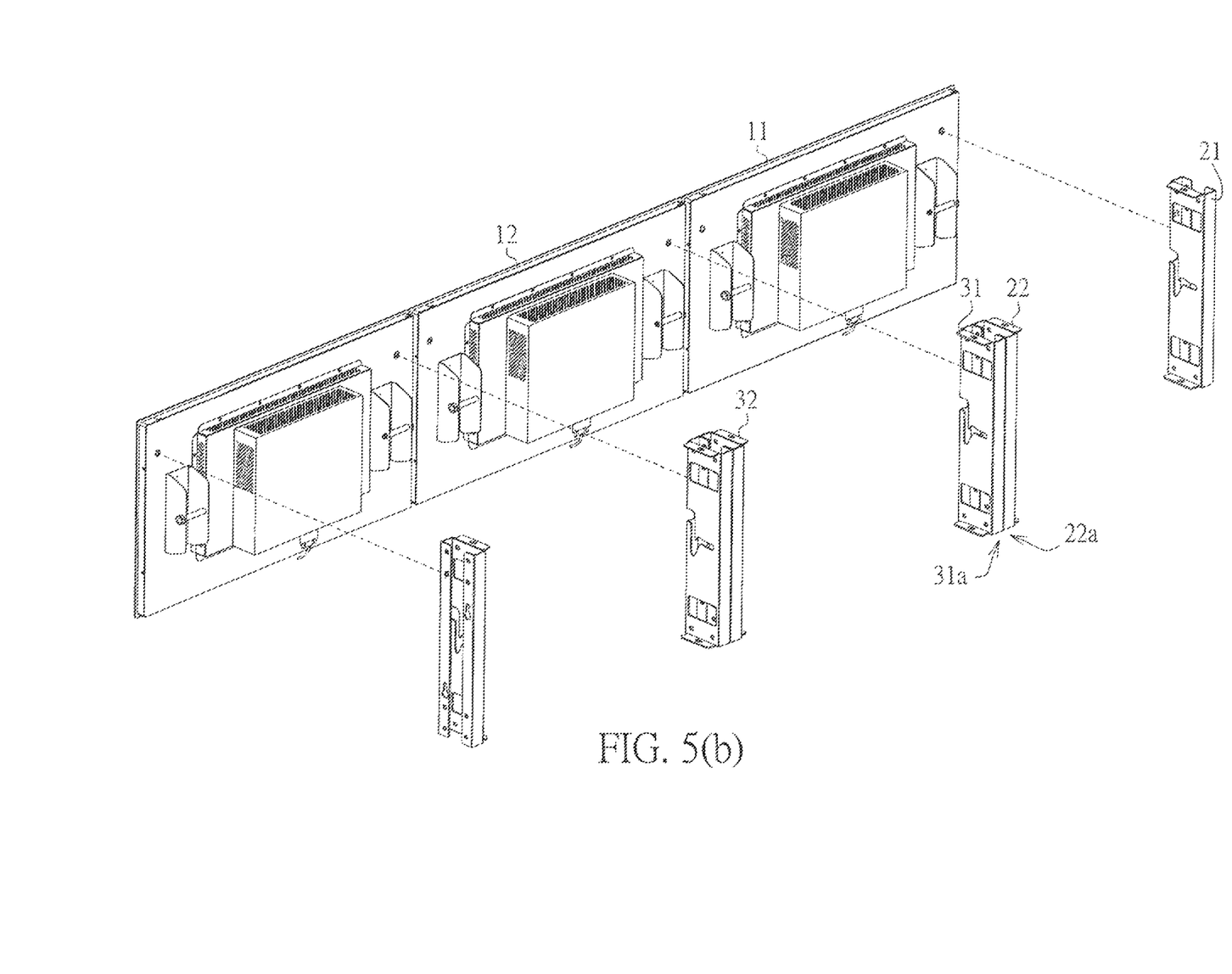
FIG. 5(b) shows a schematic diagram of several flat panel displays connected in parallel in a horizontal direction to be mounted on the supporting stands.

The implementation of the present invention is exemplified by a second embodiment below. Referring to both FIGS. 5(a) and (b). FIG. 5(a) shows a schematic diagram of two supporting stands connected in parallel in a horizontal direction. FIG. 5(b) shows a schematic diagram of several flat panel displays connected in parallel in a horizontal direction to be mounted on the supporting stands.

Based on the above disclosure, the augmentation of the present embodiment is exemplified by adding one flat panel display along the horizontal direction and the vertical direction respectively, and the augmentation with more monitors can be obtained by the same analogy. The monitor supporting module 20 of the first embodiment includes a third supporting stand 31, a fourth supporting stand 32, a fifth supporting stand (not illustrated in the diagram), a sixth supporting stand (not illustrated in the diagram), and a second fixing component and a third fixing component (not illustrated in the diagram and respectively including two corresponding fixing stands and two corresponding guide bars). In the present embodiment, the structural design and the sizes of relevant augmentation elements are the same as that of the first embodiment. That is, a second flat panel display 12 and a third flat panel display (not illustrated in the diagram) can be mounted and installed in the same manner. According to the design of a preferred implementation, the shape and the size of the second and the third flat panel display are the same as that of the first flat panel display 11. The size of the placing space should correspond to the size of several flat panel displays connected in parallel.

According to the parallel connection in a horizontal direction as indicated in FIGS. 5(a) and (b), the first side 31a of the third supporting stand 31 and the first side 22a of the second supporting stand 22 are combined together (the first side refers to the rear of the supporting stand corresponding to the guide bar). That is, the notches n1 of the supporting stands all face the same direction. In addition, corresponding holes can be designed on the first sides 22a and 31a of the supporting stands 22 and 31 such that every two supporting stands arranged in a left-right manner can be latched together by screws. When the installation of the supporting stands 22, 31, and 32 is completed and the second fixing component is already installed on the second flat panel display 12, the supporting stands 31 and 32 can be installed on the second flat panel display 12 subsequently.

Based on the disclosure of FIG. 5(b), more flat panel displays can be connected in parallel in a vertical direction. According to the parallel connection in a vertical direction, the bottom surface of the fifth supporting stand and the top surface of the first supporting stand 21 are combined together, and so are the bottom surface of the sixth supporting stand and the top surface of the second supporting stand 22 combined together. In addition, corresponding holes can be designed on the bottom surface and the top surface of the supporting stands, such that every two supporting stands arranged in a top-down manner can be latched together by screws. When the installation of the supporting stands is completed and the third fixing component is already installed on the third flat panel display, the fifth and the sixth supporting stands can be installed on the third flat panel display subsequently.

Based on the disclosure of the first and the second embodiments, the same effect can be achieved through modifications and adjustments of the two embodiments. For example, the height of a single supporting stand and the number of corresponding guide rails formed thereon are designed according to the number of monitors and the total height desired by the user in the vertical direction. In other words, the number of guide rails formed on a particular supporting stand is not limited to one. As long as the height of the installed supporting stands corresponds to the total height of the monitors connected in parallel in a vertical direction, and the number and the positions of the guide rails formed on the supporting stands correspond to that of the monitors connected in parallel in a vertical direction, the mounting and installation can be directly completed and there is no need to combining the top surface and the bottom surface of every two of the supporting stands.

The placing space used in the mounting and installation of one single flat panel display or several flat panel displays forming a large-sized TV wall is not limited to a recessed region of a wall. For example, the same mounting and installation effect can be achieved by fixing the bottom surface of two supporting stands to the floor of the placing space and fixing the top surface of the supporting stands to the ceiling of the placing space. In other words, the application of placing space can be modified to fit users' various needs, and such application involves the design of interior decoration and the manufacturing of the supporting stand with specific height.

In the first embodiment, the first fixing stand 23 and the second fixing stand 24 are separated from each other and are disposed on the rear 11*b* of the first flat panel display 11. Although the flat panel displays provided by different manufacturers may differ from each other in terms of appearance, style and the rear in particularly, the rears of most flat-screen TVs or monitors have corresponding pitches conformed to the VESA specification for mounting or installing fixing stands or wall hanging racks. The monitor supporting module of the present invention is designed with respect to the mounting or installation of the fixing stands or the wall hanging racks.

Figure 6:
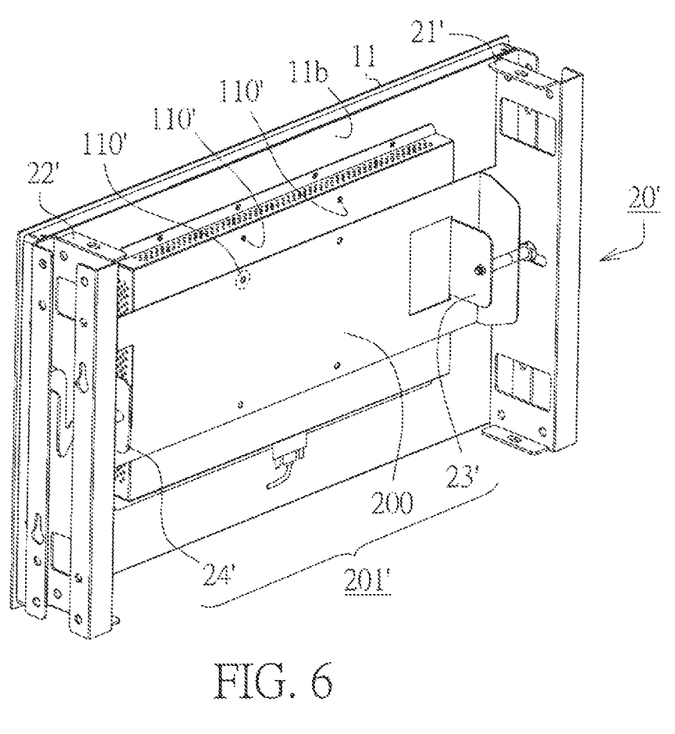
FIG. 6 shows a schematic diagram of a monitor supporting module 20' installed on the first flat panel display 11.

The implementation of the present invention is exemplified by a third embodiment below. Referring to FIG. 6, a schematic diagram of a monitor supporting module 20' installed on the first flat panel display 11 is shown. The flat panel display used in the present embodiment can be the same as or different from that used in the first embodiment, and the first wall cavity group 110' is realized by holes conformed to the VESA specification. As indicated in FIG. 6, the structure of the supporting stands 21' and 22' of the monitor supporting module 20' used in the present embodiment is the same as that of the monitor supporting module 20 used in the first embodiment. The difference lies in that the first fixing component 201' of the monitor supporting module 20' has a fixing plate 200, while the two ends of the fixing plate 200 respectively form a first fixing stand 23' and a second fixing stand 24', and the fixing plate 200 is disposed on the corresponding holes of the first wall cavity group 110' by screws. In other words, the two fixing stands 23' and 24' of the present embodiment are combined with the fixing plate 200 to form an integral element, and the rear 11*b* is installed through the holes conformed to the VESA specification. The design and the guiding method of the guide bars of the monitor supporting module 20' can be the same as that of the guide bars of the monitor supporting module 20 used in the first embodiment.

In terms of installation design, the first embodiment to the third embodiment are all exemplified by the design that the guide rails are disposed on the supporting stand and the corresponding guide bars are disposed on the fixing stand on the rear of the monitor. Based on the design concept of the above embodiments, the setting positions of the guide rails and the guide bars of the monitor supporting module of the invention are exchangeable. That is, the guide rails are disposed on the fixing stand on the rear of the monitor and the corresponding guide bars are disposed on the supporting stand, and the same effect of mounting and installation still can be achieved.

Figure 7A:
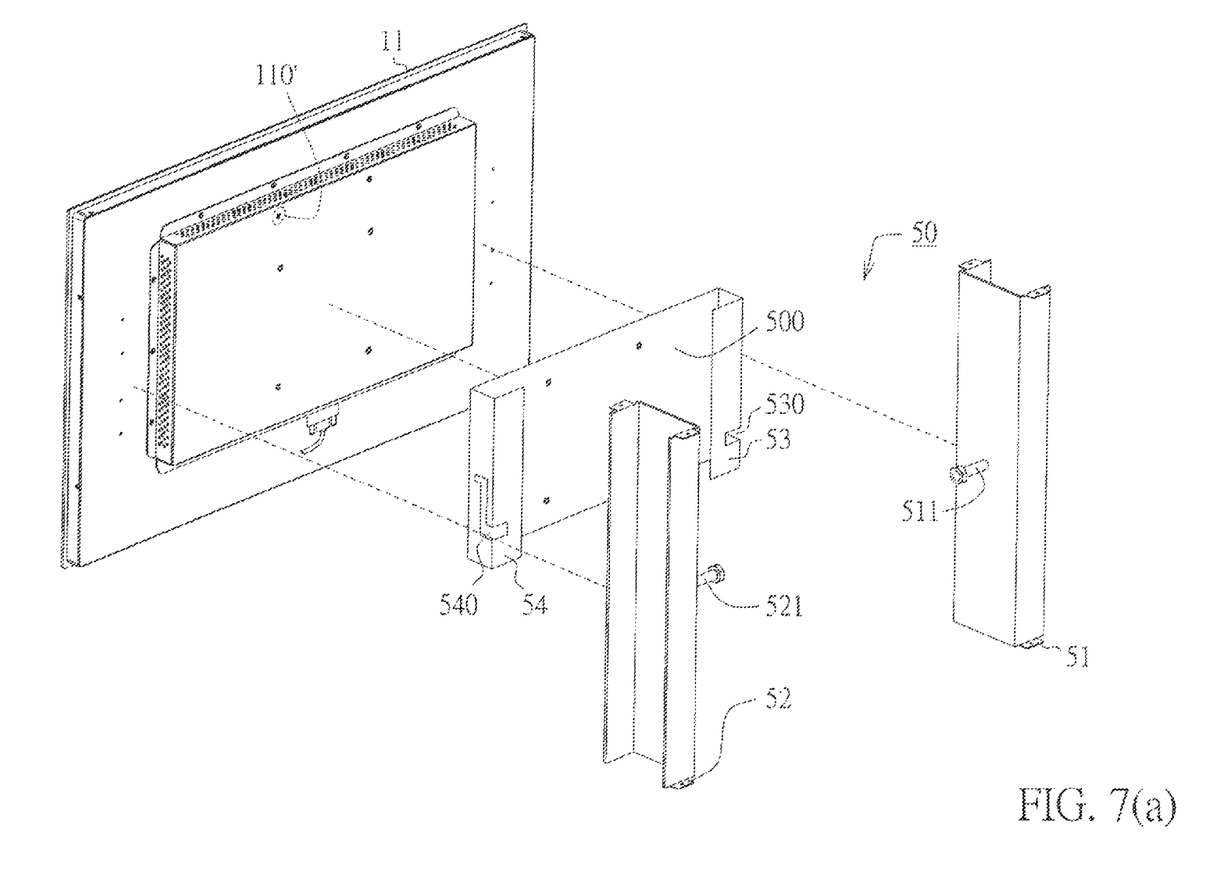
FIG. 7(a) shows an element decomposition diagram of a monitor supporting module 50 of the present invention.
Figure 7B:
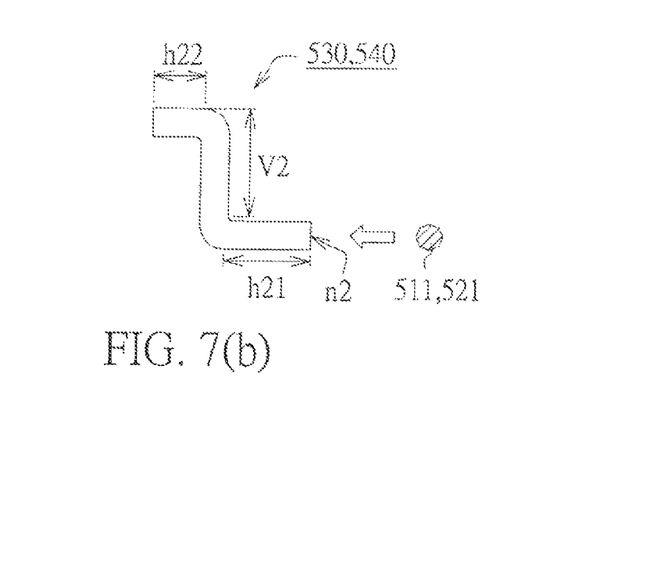
FIG. 7(b) shows enlarged side view of the guide rails 530 and 540.
Figure 7C:
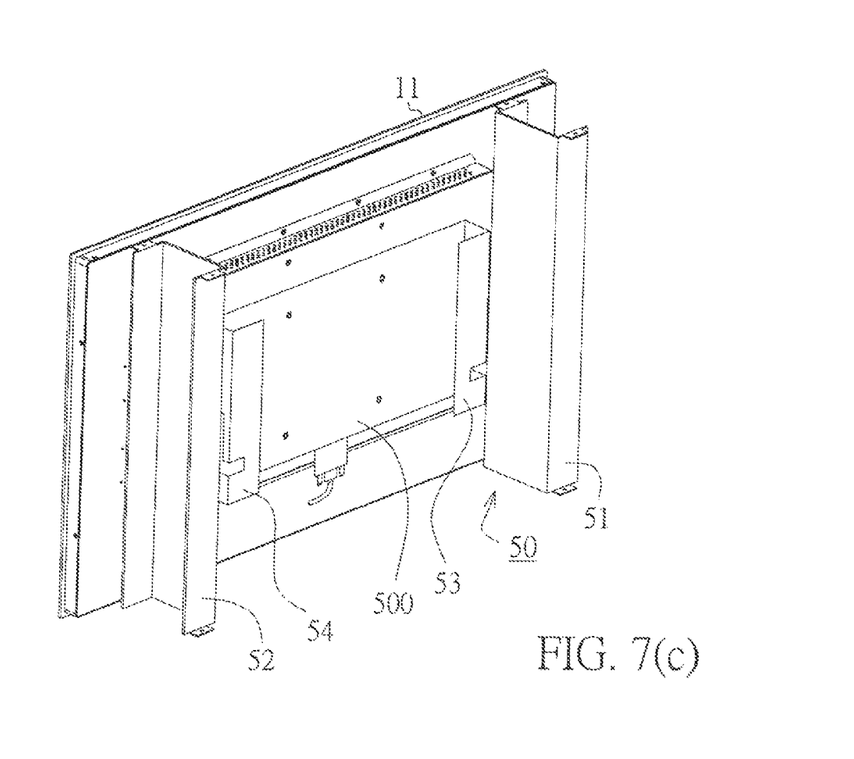
FIG. 7(c) shows a schematic diagram of the first flat panel display 11 and the monitor supporting module 50 assembled together.

The implementation of the present invention is further exemplified by a fourth embodiment below. Referring to FIGS. 7(*a*)~(*c*). FIG. 7(*a*) is an element decomposition diagram of a monitor supporting module 50 of the present invention. FIG. 7(*b*) is enlarged side view of the guide rails 530 and 540. FIG. 7(*c*) is a schematic diagram of the first flat panel display 11 and the monitor supporting module 50 assembled together.

The flat panel display 11 used in the present embodiment is the same as that used in the third embodiment, and uses the wall cavity group 110' conformed to the VESA specification for installation. As indicated in FIG. 7(*a*), the present embodiment has a feature: a first guide bar 511 and a second guide bar 521 are respectively disposed on a first supporting stand 51 and a second supporting stand 52 which are fixed to the placing space. The diagram shows that the setting positions of the guide bars 511 and 521 are corresponding to each other, and the end edges of the guide bars 511 and 521 can be designed as a nut structure formed by step screw elements. Besides, in the present embodiment, the two ends of a fixing plate 500 of the monitor supporting module 50 respectively form a first fixing stand 53 and a second fixing stand 54, and the first fixing stand 53 and the second fixing stand 54 respectively have a first guide rail 530 and a second guide rail 540 which are symmetric to each other.

Likewise, as indicated in FIG. 7(*b*), each of the guide rails 530 and 540 has a notch n2, a first horizontal guide section h21, a vertical guide section v2 and a second horizontal guide section h22. In the present embodiment, the fixing plate 500 forming the guide rails 530 and 540 is located on the rear of the monitor, and the first horizontal guide section h21 is located under the second horizontal guide section h22. That is, after the guide bars 511 and 521 enter the notch n2, the notch n2 in conjunction with the monitor 11 guide the guide bars 511 and 521 to the first horizontal guide section h21 in a horizontal direction. After the guide bars 511 and 521 slide through the vertical guide section v2 in a vertical direction, a force is applied to push the guide bars 511 and 521 to the second horizontal guide section h22 for completing the mounting and installation of the flat panel display 11 as indicated in FIG. 7(*c*). The diagram shows that the guide bars 511 and 521 complete the mounting and installation with respect to the guide rails 530 and 540, the fixing stands 53 and 54 will respectively lean on the corresponding supporting stands 51 and 52. According to the design of a preferred implementation, a gap is formed between the fixing stands 53 and 54 and the corresponding supporting stands 51 and 52 for making the installation convenient and avoiding collision and friction.

In the present embodiment, the implementation of the bump structure and the pit structure for enhancing the robustness of installation can be the same as that of the first embodiment. Likewise, the placing space of the present embodiment can also be realized by a recessed region of a wall. Alternatively, the application of the placing space can be modified to fit users' various needs, and such application involves the design of interior decoration and the manufacturing of the supporting stand with specific height. For example, the height of the supporting stands can be extended so that the supporting stands can be fixed between the floor and the ceiling.

To summarize, apart from being used in the mounting and installation of a flat panel display, the monitor supporting module of the present invention can further achieve an effect of embedding installation with respect to the characteristics of the placing space and the users' needs so as to provide an even and smooth appearance of the front side of the monitor and the wall. Next, through the design of guide rails and guide bars, the flat panel display once installed will not come off the mechanism easily. The monitor supporting module of the present invention can further support the installation of several flat panel displays connected in parallel and present the display effect of a large-sized TV wall. Meanwhile, the design of the elements of the present invention not only reduces manufacturing complexity and manufacturing cost, but also simplifies assembly procedures and reduces the required time. Therefore, the present invention effectively resolves relevant problems mentioned in the prior art, and successfully achieves the objects of the invention.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A monitor supporting module used for installing a flat panel display, wherein the monitor supporting module comprises:
   a first supporting stand fixed to a placing space, wherein the first supporting stand further has a first guide bar disposed thereon;
   a second supporting stand fixed to the placing space, wherein the second supporting stand further has a second guide bar disposed thereon; and
   a fixing plate disposed on a rear of the flat panel display, wherein two ends of the fixing plate respectively form a first fixing stand and a second fixing stand respectively having a first guide rail and a second guide rail symmetric to each other;
   wherein the first guide bar and the second guide bar are respectively set corresponding to the first guide rail and the second guide rail, each of the first guide rail and the second guide rail has a notch near a lower end of each of the first guide rail and the second guide rail, a first horizontal guide section, a vertical guide section and a second horizontal guide section located above the notch and the first horizontal guide section, and each of the first guide bar and the second guide bar is guided to the notch of each of the first guide rail and the second guide rail through its protruded end edge and slides through the first horizontal guide section, the vertical guide section and the second horizontal guide section for installing the flat panel display.

2. The monitor supporting module according to claim 1, wherein the rear of the flat panel display has a wall cavity group, and the fixing plate is disposed on corresponding holes of the wall cavity group by screws.

3. The monitor supporting module according to claim 1, wherein the first fixing stand and the second fixing stand respectively lean on the first supporting stand and the second supporting stand.

4. The monitor supporting module according to claim 1, wherein the placing space is a recessed region of a wall, and a front side of the flat panel display and a protruded region of the wall are coplanar.

5. The monitor supporting module according to claim 1, wherein the first supporting stand and the second supporting stand lean on two sides of the rear of the flat panel display, and each of the first supporting stand and the second supporting stand has at least one pit structure corresponding to the at least one bump structure of each of the two sides of the rear of the flat panel display for installing the flat panel display.

6. The monitor supporting module according to claim 1, wherein a bottom surface and a top surface of both of the first supporting stand and the second supporting stand are respectively fixed to a floor and a ceiling of the placing space.

* * * * *